United States Patent
Suzuki

(10) Patent No.: US 6,290,573 B1
(45) Date of Patent: Sep. 18, 2001

(54) TAPE BURNISH WITH MONITORING DEVICE

(75) Inventor: Shoiji Suzuki, San Jose, CA (US)

(73) Assignee: Komag, Incorporated, San Jose, CA (US)

( * ) Notice: Subject to any disclaimer, the term of this patent is extended or adjusted under 35 U.S.C. 154(b) by 0 days.

(21) Appl. No.: 09/382,222

(22) Filed: Aug. 23, 1999

(51) Int. Cl.⁷ ..................................... B24B 49/00
(52) U.S. Cl. ................................. 451/8; 451/307
(58) Field of Search .................. 451/5, 6, 8, 9, 451/59, 63, 296, 303, 307

(56) References Cited

U.S. PATENT DOCUMENTS

| | | |
|---|---|---|
| 4,532,802 | 8/1985 | Yeack-Scranton et al. |
| 5,012,618 * | 5/1991 | Price et al. ............... 51/140 |
| 5,099,615 * | 3/1992 | Ruble et al. ............. 51/165.71 |
| 5,313,352 | 5/1994 | Chikazawa et al. |
| 5,423,207 | 6/1995 | Flechsig et al. |
| 5,443,415 * | 8/1995 | Shebanow et al. ........... 451/302 |
| 5,791,969 * | 8/1998 | Lund ............................... 451/5 |
| 5,820,446 * | 10/1998 | Lu ................................... 451/37 |

* cited by examiner

Primary Examiner—Timothy V. Eley
Assistant Examiner—Dung Van Nguyen
(74) Attorney, Agent, or Firm—Skjerven Morrill MacPherson LLP; Brian D. Ogonowsky; Michael J. Halbert

(57) ABSTRACT

A monitoring device is used to monitor the performance of a burnishing apparatus that uses a burnishing tape. The monitoring device monitors the contact between the burnishing tape and the disk. The monitoring device may include an acoustic emission sensor, e.g., a piezo-electric transducer, that is mounted on the elements that press the burnishing tape into contact with the disk. Elastic waves that are produced by the contact between the burnishing tape and the disk propagate through the pressure applying element, received by the sensor and are converted into electric signals. The electric signals from the sensor are converted into amplitude signals in the time domain and/or signals in the frequency domain. Alternatively, the monitoring device may measure the elastic waves propagating through the disk, the tension on the burnishing tape, and/or the frictional force between the burnishing tape and the disk.

16 Claims, 5 Drawing Sheets

TAPE BURNISH WITH MONITORING DEVICE

FIELD OF THE INVENTION

The present invention relates to burnishing the surfaces of a disk with a burnishing tape. More particularly, the present invention relates to using a monitoring device to sense the quality and effectiveness of the burnishing process.

BACKGROUND

Magnetic memory disks, such as the type typically used in a computer hard drive, have a smooth surface over which the read/write head flies during operation. The trend has been to reduce the fly height of the read/write head over the surface of the disk to increase the data recording density on the disk. While it is desirable for a read/write head to fly as close as possible to the surface of the disk, it is important that the read/write head does not contact the disk or defects on the surface of the disk. A defect on the surface of the disk that physically contacts the read/write head may damage the read/write head, the disk, or both. Consequently, care must be taken during the disk processing and testing to assure that there are no defects on the surface of the disk that are greater than the fly height of the read/write head, which today is approximately 1 $\mu$" (microinch).

Typical magnetic disks include an aluminum, glass, or silicon substrate that is plated with a NiP (nickel phosphate) layer and then textured, e.g., for the contact start stop zone. An underlayer of Cr (chromium) or NiP is sputtered on the plated NiP layer, a thin film of magnetic recording material, typically a Co (cobalt) alloy, is sputtered on the underlayer, followed by the deposition of a protective coating and a lubrication layer. The disk is then burnished to remove any asperities prior to testing the disk to assure the disk meets the required surface specifications. Presently, some magnetic disks are specified to have a roughness less than or equal to about 30 angstroms (3 nanometers).

A conventional method of burnishing the surfaces of a disk includes the use of an abrasive burnishing tape. FIG. 1 shows a portion of a conventional burnishing apparatus 10 including burnishing tape 12. The burnishing tape 12 is pressed against the surfaces of a disk 14 by pressure applying elements, such as pads 16. Pads 16 are mounted on mounting blocks 18 that are controlled by the burnishing apparatus to move towards or away from the surfaces of the disk 14, as indicated by arrows 19. Disk 14 is mounted on a spindle 20 that rotates disk 14 as indicated by arrow 22. Disk 14 and pads 16 move relative to each other, as indicated by arrow 24 so that a desired amount of the surfaces of disk 14 are burnished.

While pads 16 are shown in FIG. 1, it is understood by those of ordinary skill in the art that burnishing tape 12 may be pressed against the surfaces of the disk using other pressure applying elements, such as air knives, rollers, or other similar devices.

Once the surfaces of the disk are burnished, the disk is then tested, for example, with a glide head or certifying head. Conventionally, if there is a problem with the burnishing machine or the burnishing tape, the problem may not be recognized until after the burnishing process and the disk is tested. Meanwhile, additional disks may be burnished on the same burnishing machine and with the same burnishing tape.

SUMMARY

A monitoring device is used to monitor the performance of a burnishing apparatus in accordance with the present invention. The monitoring device includes at least one sensor that monitors the contact between the burnishing tape and the rotating disk.

In one embodiment the monitoring device includes at least one sensor that monitors the elastic waves produced by the contact between the rotating disk and the burnishing tape. The sensor may be an acoustic emission sensor, e.g., a piezo-electric transducer, that is coupled to the pressure applying element. The sensor receives the elastic waves propagating through the pressure applying element and converts the elastic waves into an electric signal. In another embodiment the sensor may detect the elastic waves propagating through the disk. For example, a vibrometer may be used to detect the vibrations in the disk and in response produce an electric signal. In another embodiment, an acoustic emission sensor mounted on the spindle upon which the disk is mounted detects the vibrations in the disk and converts the elastic waves into an electric signal.

Other embodiments include measuring the tension on the burnishing tape and measuring the frictional force between the rotating disk and the burnishing tape. The tension may be measured with a tension gauge coupled to a guide roll for the burnishing tape. The frictional force may be determined by analyzing the current used by the spindle motor to rotate the disk, which indicates the torque applied to the disk. The torque applied to the disk is proportional to the frictional force between the disk and the burnishing tape and the radius of the disk where the frictional force is applied.

The signals from the monitoring device sensor is converted into an amplitude signal in the time domain using a filter or into a signal in the frequency domain by performing a fast fourier transform. The amplitude signal may be used into indicate characteristics such as alignment of the pressure applying element and the type of burnishing tape being used. The signals in the frequency domain indicate, e.g., the lubrication condition of the disk.

BRIEF DESCRIPTION OF THE DRAWINGS

The above and other features, aspects, and advantages of the present invention will become better understood with regard to the following description, appended claims, and accompanying figures, where:

DETAILED DESCRIPTION

Figure 1:
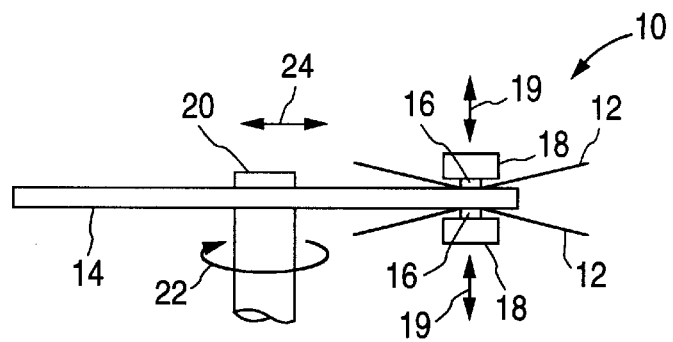
FIG. 1 shows a side view of a burnishing apparatus using burnishing tape to burnish the surfaces of a disk.
Figure 2:
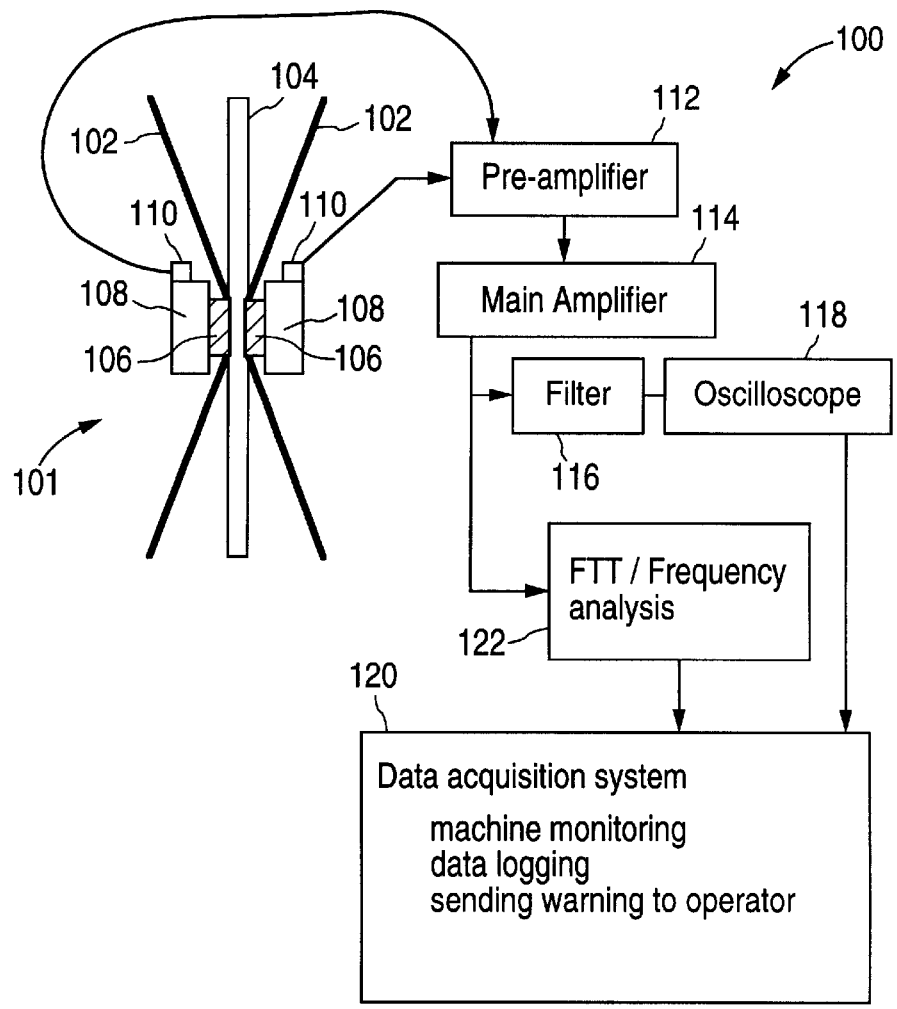
FIG. 2 is a schematic view of a monitoring device and associated electronics on a burnishing apparatus in accordance with an embodiment of the present invention.

FIG. 2 is a schematic view of a monitoring device 100 used to monitor the performance of a burnishing apparatus 101 in accordance with the present invention.

As shown in FIG. 2, an abrasive burnishing tape 102 is pressed against both surfaces of a magnetic or magneto-optic disk 104 with pads 106. Only a portion of disk 104 is shown in FIG. 2. Pads 106 are mounted on pad mounting blocks 108, which are controlled to apply the desired pressure against disk 104. Sensors 110, such as acoustic emission sensors, are mounted to the pad mounting blocks 108. Sensors 110 may be, for example, a piezo-electric transducer (PZT) such as Part No. S9225 manufactured by Physical Acoustics in Princeton, New Jersey.

Disk 104 is mounted on a spindle and rotated as burnishing pads 106 press burnishing tape 102 against the surfaces of disk 104. Thus, burnishing tape 102 is rubbed against the surfaces of disk 104. The contact between the burnishing tape 102 and the disk 104 produces weak elastic waves that propagate through pads 106 and pad mounting blocks 108 and are received by sensors 110. Sensors 110 transform the elastic waves into an electric signal.

It should be understood that while pads 106 and pad holders 108 are shown in FIG. 2, other types of pressure applying elements may be used including rollers. Because sensors 110 rely on elastic waves propagating through the pressure applying elements, air knives may not be used in place of pads 106.

Sensors 110 are coupled to a main amplifier 114 via pre-amplifier 112. Pre-amplifier 112 may be, for example, a model no. 1220A, manufactured by Physical Acoustics, and main amplifier 114 may be, for example, a mode no. AElA, also manufactured by Physical Acoustics.

The electric signal produced by sensors 110 can be converted into an amplitude signal in the time domain or a signal in the frequency domain. To convert the electric signal from sensors 110 into an amplitude signal, main amplifier 114 is coupled to a filter 116 and oscilloscope 118. Filter 116 is a high pass filter and, for example, may be a Krohn-Hite Model 3944 filter. The oscilloscope 118 may be, e.g., a HP420A oscilloscope manufactured by Hewlett-Packard. The oscilloscope 118 permits the operator of the burnishing apparatus to visually inspect the performance of the burnishing apparatus.

The oscilloscope 118 is coupled to a data acquisition system 120. Data acquisition system 120 may be, for example, a HP E8900, manufactured by Hewlett-Packard. In general, data acquisition system 120 monitors the burnishing process and consists of a signal converter, a data storage device, such as memory or hard disk drive, and a computer. The signal converter converts an analog signal, such as the voltage signal produced by sensor 110 into a digital signal. The converted digital signal is stored in memory for data manipulation, which is done by the computer. Thus, the signal produced by the sensors 110 can be stored in data acquisition system 120 to calculate the frequency component or to detect the peak amplitude and compare it against a desired threshold. If the peak exceeds the threshold, the computer can send a message to the operator or to the computer which controls the burnish machine. Of course, other data acquisition systems may be used if desired.

The amplitude signal from oscilloscope 118 can be used, for example, to monitor the consistency of the burnishing process in a single machine or to check the consistency from machine to machine. The amplitude signal can also be used as an indication of the alignment of the burnishing pad 106 and the type of burnishing tape 102 used. Thus, amplitude signals can be used to check the maintenance condition of the burnishing apparatus and to prevent wrong settings.

Figure 3A:
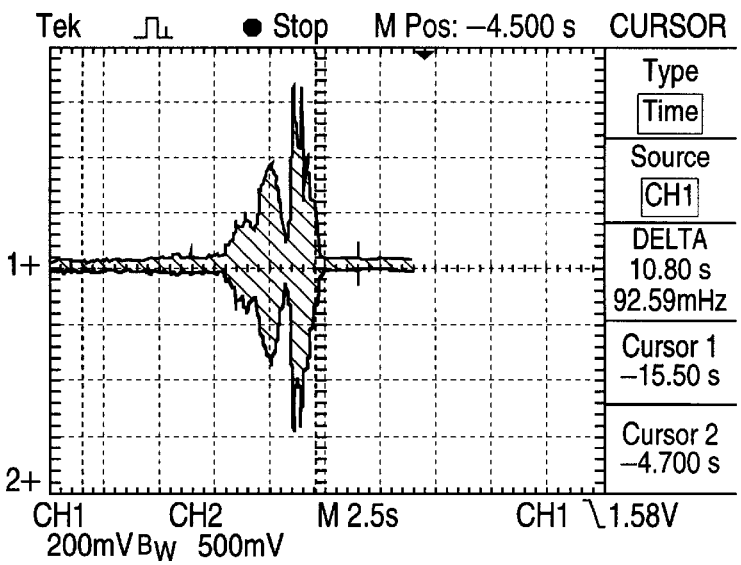
FIGS. 3A, 3B, and 3C show examples of amplitude signals over one cycle produced by the monitoring device shown in FIG. 2.
Figure 3B:
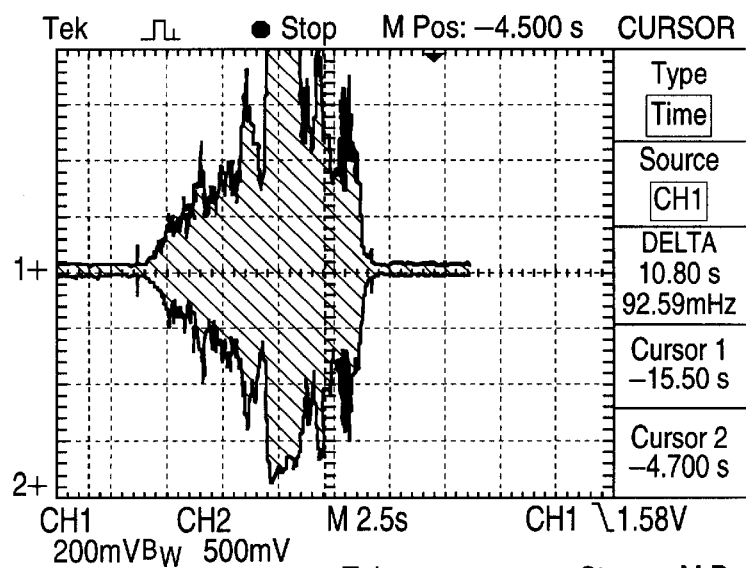
Figure 3C:
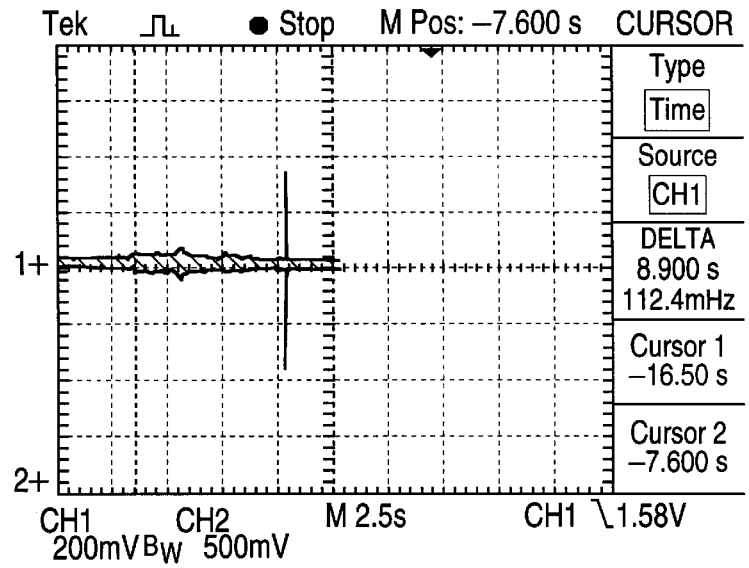

FIGS. 3A, 3B, and 3C show examples of amplitude signals over one cycle produced by monitoring device 100.

In FIGS. 3A, 3B, and 3C, the same type of lubricated disk is used with the disk rotating at 1500rpm from loading to unloading the burnishing tape. FIG. 3A shows a normal amplitude signal produced by oscilloscope 118 when the pad 106 is properly aligned. FIG. 3B shows an increased amplitude signal produced when pad 106 is improperly aligned. FIG. 3C shows a decreased amplitude signal produced when a different type of burnishing tape 102 is used. The burnishing tape used in FIG. 3C had a smaller abrasive particle than on the burnishing tapes used in FIGS. 3A and 3B. The ratio of the average diameter of the abrasive particle was 1 to 2. The applied load and other setting were the same.

As shown in FIG. 2, the main amplifier 114 is also coupled to a microprocessor 122 that performs a fast fourier transform on the output signal from main amplifier 114. The output signal from main amplifier 114 is converted into the frequency domain by microprocessor 122. The microprocessor 122 may be, for example, a HP 89410A Vector Signal Analyzer, manufactured by Hewlett-Packard. The microprocessor 122 is also coupled to the data acquisition system 120. Thus, the data acquisition system 120 monitors both the amplitude signal from oscilloscope 118 and the frequency measurement from microprocessor 122. The frequency measurement can be used as an indication of the lubrication between disk 104 and burnishing tape 102. This is advantageous as an additional safety measure to find a mistake in the lubrication processes that occur prior to the burnishing process. Frequency measurement may be useful if the signals produced by sensors 110 contain noise with a high amplitude. This may occur if a power supply for the spindle motor emits radio waves close to the sensor signal. The noise usually has high amplitude and appears at a constant frequency. Thus, the noise can be recognized in the frequency domain.

Figure 4A:
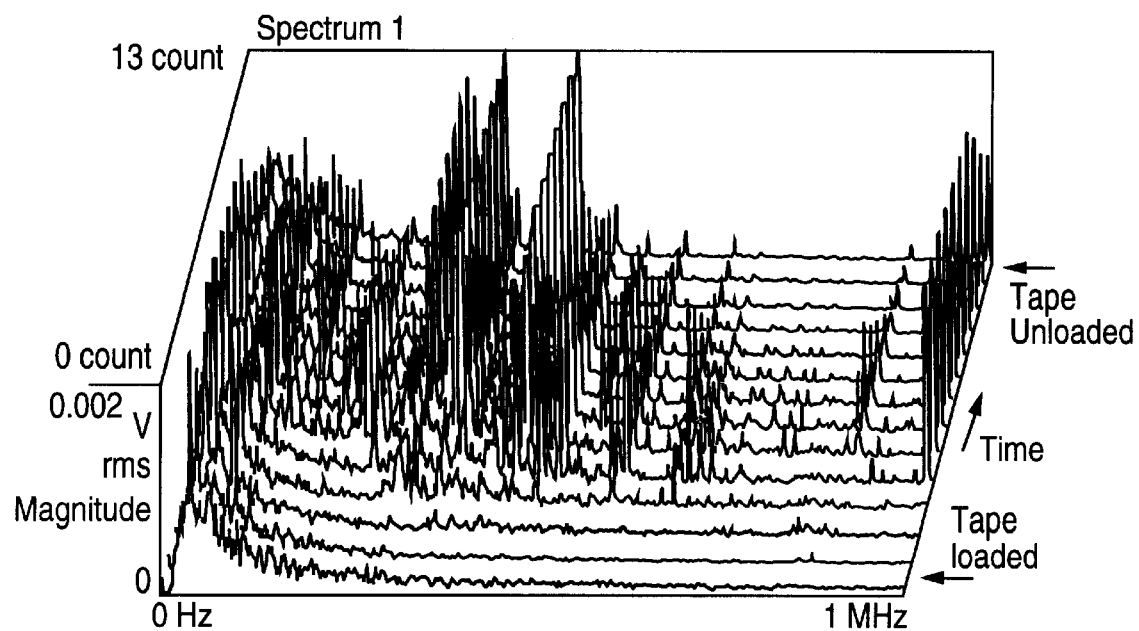
FIGS. 4A and 4B show examples of frequency signals produced by the monitoring device shown in FIG. 2.
Figure 4B:
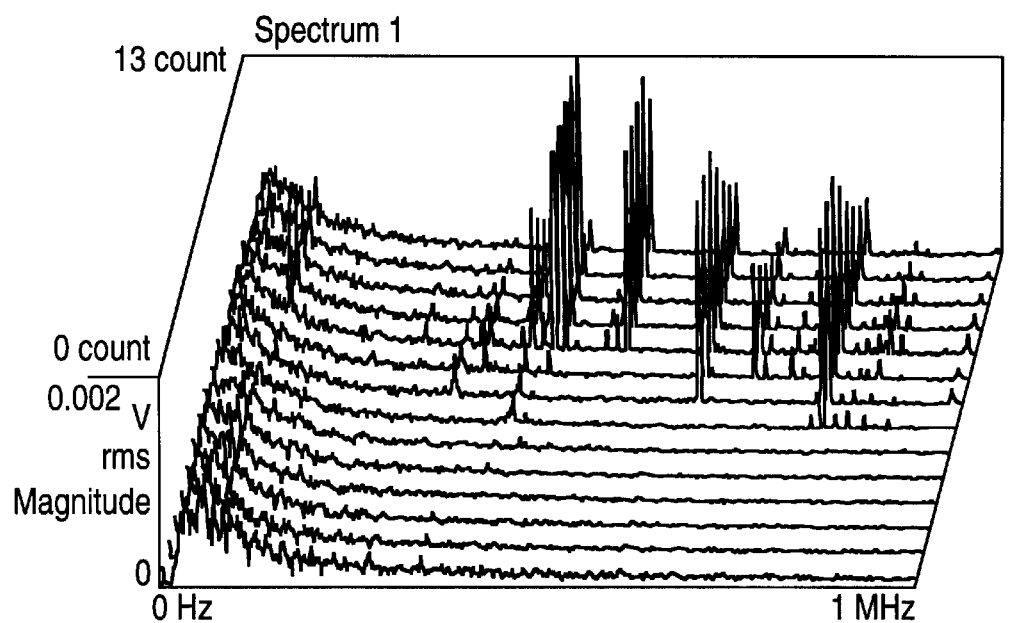

FIGS. 4A and 4B show examples of frequency measurements produced by monitoring device 100, where the X axes represents frequency, the Y axes represents magnitude of the output signal, and the Z axes represents time. The measurements are taken from a disk 104 rotating with a constant linear velocity (CLV) thus the burnishing speed remains constant regardless of the radii. FIG. 4A shows a 14 count measurement over one CLV cycle on a lubricated disk. FIG. 4B shows a 14 count measurement over one CLV cycle on a non-lubricated disk. Frequency measurements may be sensitive to parameters such as the burnish tape size (including size of abrasive particle, and the tape material), the pad material (hardness and size), the applied load, and tape tension.

Figure 5:
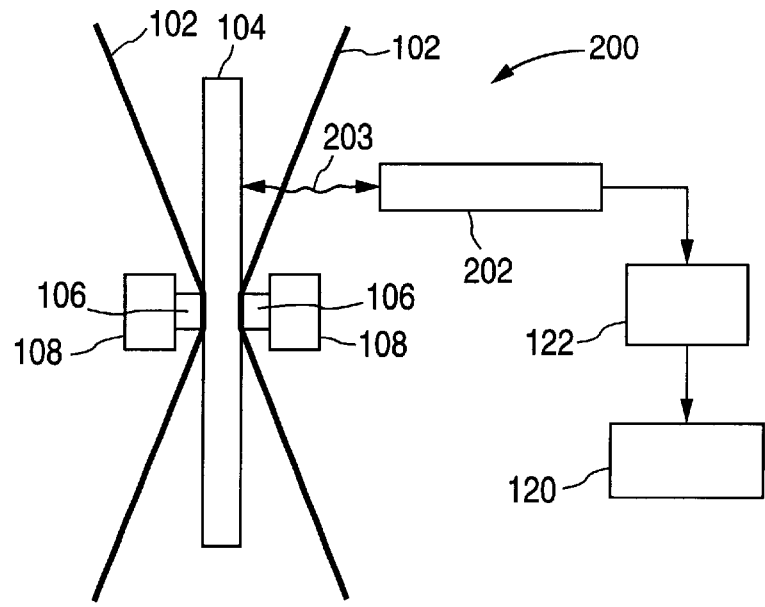
FIG. 5 is a schematic view of a monitoring device in accordance with another embodiment of the present invention.

Different types of sensors and sensing techniques may be employed during the burnishing process in accordance with other embodiments of the present invention. FIG. 5 shows an embodiment of the present invention in which a monitoring device 200 includes a laser doppler vibrometer 202 that produces a laser beam 203 that is reflected off of disk 104 and received by the vibrometer 202. Vibrometer 202 may be, for example, a OFV-502 fiber sensor manufactured by Polytech, located in Costa Mesa, California.

The elastic waves that are produced by burnishing tape 102 rubbing against disk 104 not only propagate through the pads 106 and pad mounting blocks 108, but the elastic waves also propagate through disk 104. The vibrometer 202 detects the elastic waves propagating through disk 104 by measuring changes in the frequency of the laser beam, which indicates the vibration on disk 104. Vibrometer 202 is shown coupled to data acquisition system 120 via microprocessor 122, which performs a fast fourier transform on the output signal produced by vibrometer 202. Of course, if desired vibrometer 202 may also or alternatively be coupled to filter 116 and oscilloscope 118 to produce amplitude signals.

Because vibrometer 202 does not rely on the transmission of elastic waves through the pad 106 and pad mounting block 108, vibrometer 202 may be used with any pressure applying elements, including air knives, rollers, pads or any other system, which are well known in the art. However, because vibrometer 202 detects vibrations in the disk 104, monitoring device 200 can not differentiate between the two sides of the disk 104.

Figure 6:
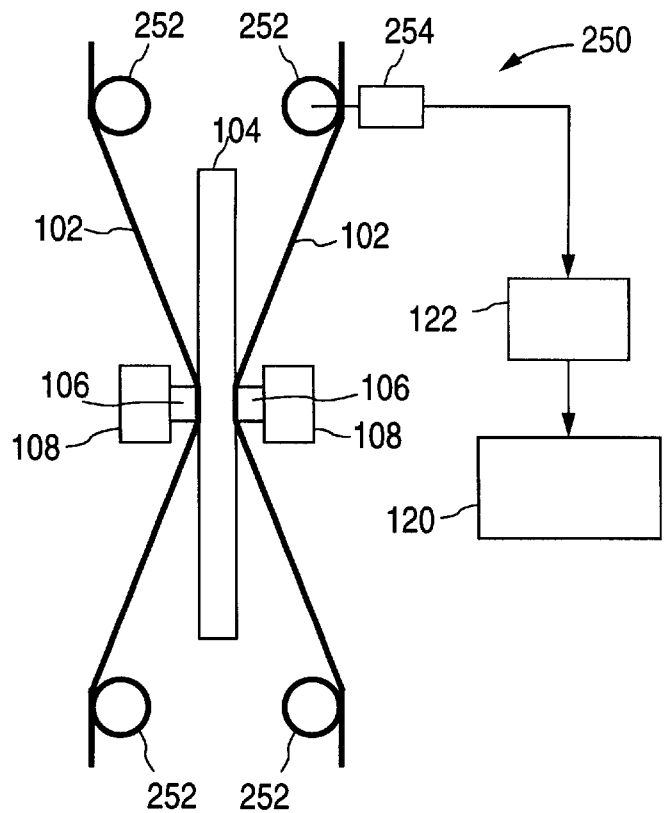
FIG. 6 is a schematic view of a monitoring device in accordance with another embodiment of the present invention.

FIG. 6 shows a monitoring device 250 in accordance with another embodiment of the present invention. As shown in FIG. 6, burnishing tape 102 travels over guide rolls 252. One or more guide rolls 252 include a tension gauge 254, which measures the tension on burnishing tape 102. Tension gauge 254 may be, for example, Model MDB-100, manufactured by Transducer Techniques, located in Temecula, Calif. Tension gauge 254 is shown coupled to microprocessor 122 and data acquisition system 120. Of course, if desired tension gauge 254 may be also or alternatively coupled to filter 116 and oscilloscope 118 to produce amplitude signals.

Figure 7:
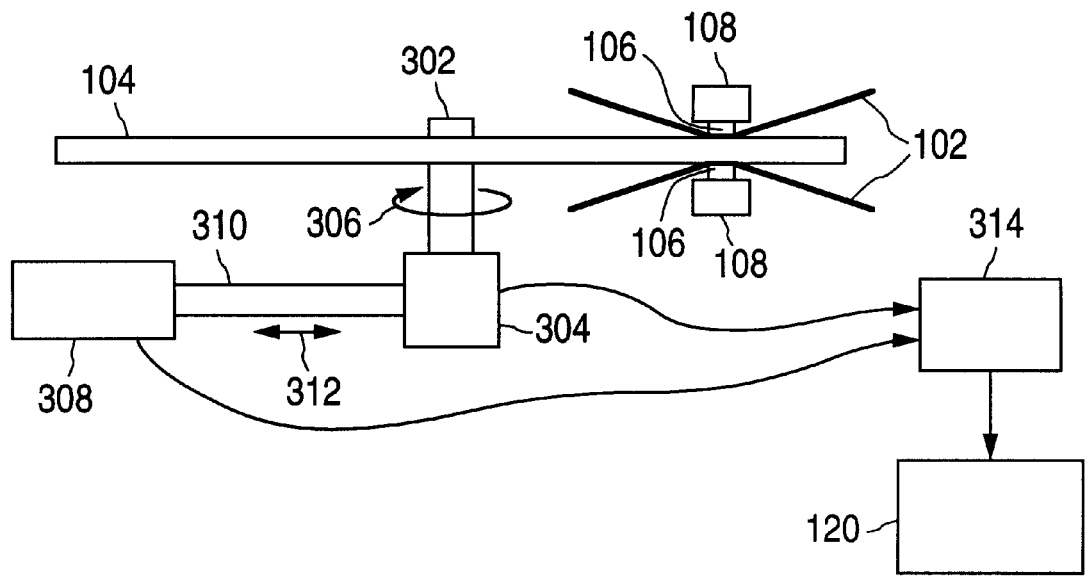
FIGS. 7 and 8 are schematic view of a monitoring device in accordance with embodiment of the present invention.

FIG. 7 shows another embodiment of a monitoring device 300. FIG. 7 shows a side view of a burnishing apparatus including burnishing tape 102, disk 104, pads 106, pad mounting blocks 108. Disk 104 is shown mounted on a spindle 302, which is driven by a spindle motor 304 to rotate disk 104 as indicated by arrow 306. In addition, spindle motor 304 is coupled to an actuator 308 via arm 310. Actuator 308 moves spindle motor 304, spindle 302, and disk 104 relative to burnishing tape 102 as indicated by arrow 312. Of course, if desired spindle motor 304 may remain stationary and burnishing tape 102 with pads 106 and pad mounting blocks 108 move.

Spindle motor 304 and actuator 308 are coupled to a microprocessor 314. Microprocessor 314 receives a current signal from spindle motor 304 indicating the amount of current being used by spindle motor 304. It should be understood that the current signal from spindle motor 304 is a measurement of the current used by spindle motor 304 and may be either a voltage level or a current level. The amount of current being used by spindle motor 304 indicates the torque being applied to disk 104 by spindle motor 304. Microprocessor 314 also receives a displacement signal from actuator 308, which indicates the relative positions of the disk 104 and burnishing tape 102, i.e., the radial location of the contact between the burnishing tape 102 and the disk 104. It should be understood that the displacement signal need not be produced by actuator 308, but may be produced by any measurement instrument, e.g., an interferometer.

Because the torque applied to disk 104 is proportional to the frictional force being applied and the radial position of the application of the frictional force, the microprocessor 314 can determine from the information provided by spindle motor 304 and actuator 308 the amount of frictional force between the burnishing tape 102 and the disk 104. Microprocessor 314 then supplies the frictional force measurement to data acquisition system 120. The friction force may be measured as the total amplitude or amplitudes in the frequency domain. Friction force is a direct indication of the interaction between the tape and the disk. Deviation from the predetermined optimum condition indicates that there is an abnormality in the burnishing process.

Figure 8:
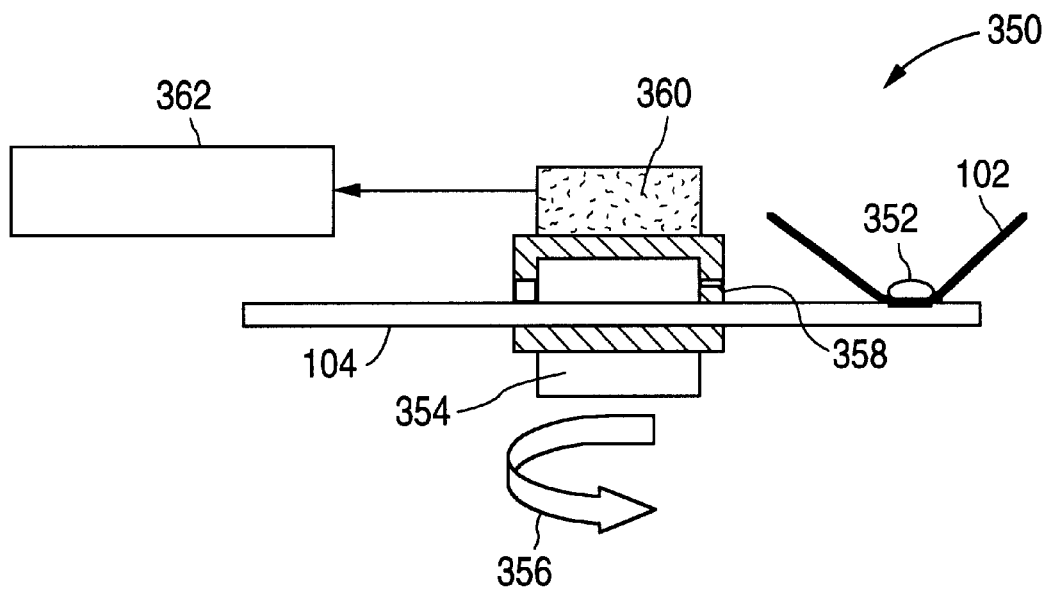

FIG. 8 shows another embodiment of a monitoring device 350. FIG. 8 shows a side view of a burnishing apparatus including burnishing tape 102, disk 104, a pressure applying element 352, which may be a pad, an air knife or other appropriate device. Disk 104 is shown mounted on a spindle 354, which is driven to rotate disk 104 as indicated by arrow 356. An acoustic emission sensor 358 is mounted on spindle 354 such that when disk 104 is mounted on spindle 354 acoustic emission sensor 358 contacts the surface of disk 104. Sensor 358 may be, for example, a piezo-electric transducer (PZT) such as Part No. S9225 manufactured by Physical Acoustics in Princeton, New Jersey. A signal generated from the acoustic emission sensor 358 is transferred through a slip-ring 360 to a detection circuit 362, such as that described in reference to FIG. 2. Slip-ring 360 may be, for example, a model S4 slip-ring manufactured by Michigan Scientific Corp., located in Michigan.

During the burnish process, the acoustic emission sensor 358 converts elastic waves in the disk 104 into an electrical signal that is converted into the desired data, as discussed above in reference to FIG. 2. Because monitoring device 350 detects elastic waves in the disk 104, monitoring device 350 can advantageously monitor the burnish process when the pressure applying element 352 is an air knife.

While the present invention has been described in connection with specific embodiments, one of ordinary skill in the art will recognize that various substitutions, modifications and combinations of the embodiments may be made after having reviewed the present disclosure. The specific embodiments described above are illustrative only. Various adaptations and modifications may be made without departing from the scope of the invention. For example, the various embodiments may be used together in any combination or in the alternative. The spirit and scope of the appended claims should not be limited to the foregoing description.

What is claimed is:

1. An apparatus for burnishing the surfaces of a rotating disk, said apparatus comprising:
   a spindle upon which a disk is mounted and rotated;
   a burnishing tape;
   at least one pressure applying element coupled to said burnishing tape, said at least one pressure applying element presses said burnishing tape into contact with said rotating disk; and
   a monitoring device having at least one sensor, said at least one sensor monitors said contact between said rotating disk and said burnishing tape, wherein said at least one sensor monitors elastic waves produced by said contact between said rotating disk and said burnishing tape, said at least one sensor producing an electric signal in response to said elastic waves.

2. The apparatus of claim 1, wherein said at least one sensor is an acoustic emission sensor coupled to said at least one pressure applying element, said at least one sensor receives said elastic waves traveling through said at least one pressure applying element.

3. The apparatus of claim 2, wherein said acoustic emission sensor is a piezo-electric transducer.

4. The apparatus of claim 1, said at least one sensor is coupled to a processor that performs a fast fourier transform on said electrical signal to generate a measurement signal in the frequency domain, and said at least one sensor is coupled to a filter to produce an amplitude signal.

5. The apparatus of claim 4, further comprising at least one amplifier coupled between said at least one sensor and said processor and said filter.

6. The apparatus of claim 4, said processor and said filter are coupled to a data acquisition system.

7. The apparatus of claim 1, wherein said at least one sensor is a vibrometer, said vibrometer measuring said elastic waves traveling through said rotating disk.

8. The apparatus of claim 1, wherein said at least one sensor is an acoustic emission sensor mounted on said spindle, said at least one sensor receives said elastic waves traveling through said disk.

9. The apparatus of claim 8, wherein said at least one sensor is in contact with said disk.

10. The apparatus of claim 1, wherein said at least one pressure applying element is a pad mounted on a pad mounting block.

11. A method comprising:
   burnishing a surface of a disk with a burnishing tape that is in contact with said surface; and
   monitoring the contact between said burnishing tape and said surface, wherein monitoring the contact comprises measuring elastic waves produced by said contact between said burnishing tape and said surface.

12. The method of claim 11, wherein measuring elastic waves comprises:
   receiving said elastic waves;
   converting said elastic waves into an electric signal; and
   analyzing said electric signal.

13. The method of claim 12, wherein burnishing said surface comprises pressing said burnishing tape against said surface of said disk with a pressure applying element and rotating said disk, said elastic waves propagate through said pressure applying element and are received by an acoustic emission sensor that converts said elastic waves into an electric signal.

14. The method of claim 11, wherein measuring elastic waves comprises detecting elastic waves propagating through said disk and in response producing an electric signal.

15. The method of claim 14, wherein detecting elastic waves propagating through said disk is performed by a laser doppler vibrometer.

16. The method of claim 14, wherein detecting elastic waves propagating through said disk is performed by an acoustic emission sensor mounted on a spindle upon which is mounted said disk, said elastic waves propagate through said disk and are received by said acoustic emission sensor that converts said elastic waves into an electric signal.

* * * * *